United States Patent [19]

Seymour

[11] 3,885,946
[45] May 27, 1975

[54] PROCESS FOR REDUCING THE CONCENTRATION OF FERTILIZER PARTICULATES IN EXHAUST STACK GASES

[75] Inventor: James E. Seymour, Virginia Beach, Va.

[73] Assignee: Royster Company, Norfolk, Va.

[22] Filed: May 11, 1973

[21] Appl. No.: 359,267

Related U.S. Application Data

[63] Continuation of Ser. No. 83,105, Oct. 22, 1970, abandoned.

[52] U.S. Cl. .................................. 71/30; 71/64 DB
[51] Int. Cl. ............................................ C05c 7/00
[58] Field of Search .......... 71/64 D, 64 DA, 64 DB, 71/34, 30, 28, 54, 58, 59; 23/313

[56] References Cited
UNITED STATES PATENTS

| | | | |
|---|---|---|---|
| 2,971,832 | 2/1961 | Stewart et al. .................... | 23/313 X |
| 3,264,084 | 8/1966 | Karcher ................................ | 71/24 |
| 3,291,595 | 12/1966 | Kearns ............................ | 71/64 DA |
| 3,499,731 | 3/1970 | Sackett ................................ | 71/41 |
| 3,666,523 | 5/1972 | Nau .................................. | 71/64 DB |
| 3,734,707 | 5/1973 | Seymour ............................. | 71/30 |

FOREIGN PATENTS OR APPLICATIONS 615,958  3/1961  Canada................................. 71/30

Primary Examiner—Charles N. Hart
Assistant Examiner—Ferris H. Lander
Attorney, Agent, or Firm—Stoll and Stoll

[57] ABSTRACT

Particulate pollution of the atmosphere by the exhaust stack gases of fertilizer manufacturing and processing plants is reduced by spraying solutions of nitrogen-containing compounds upon fertilizer particulates prior to the air-cooling phase of the operation in order to bond relatively fine, dust-like particles to each other and to relatively larger particles, and thereby to reduce the emission of such fine, dust-like particles into the ambient atmosphere through the air-cooler exhaust.

25 Claims, 1 Drawing Figure

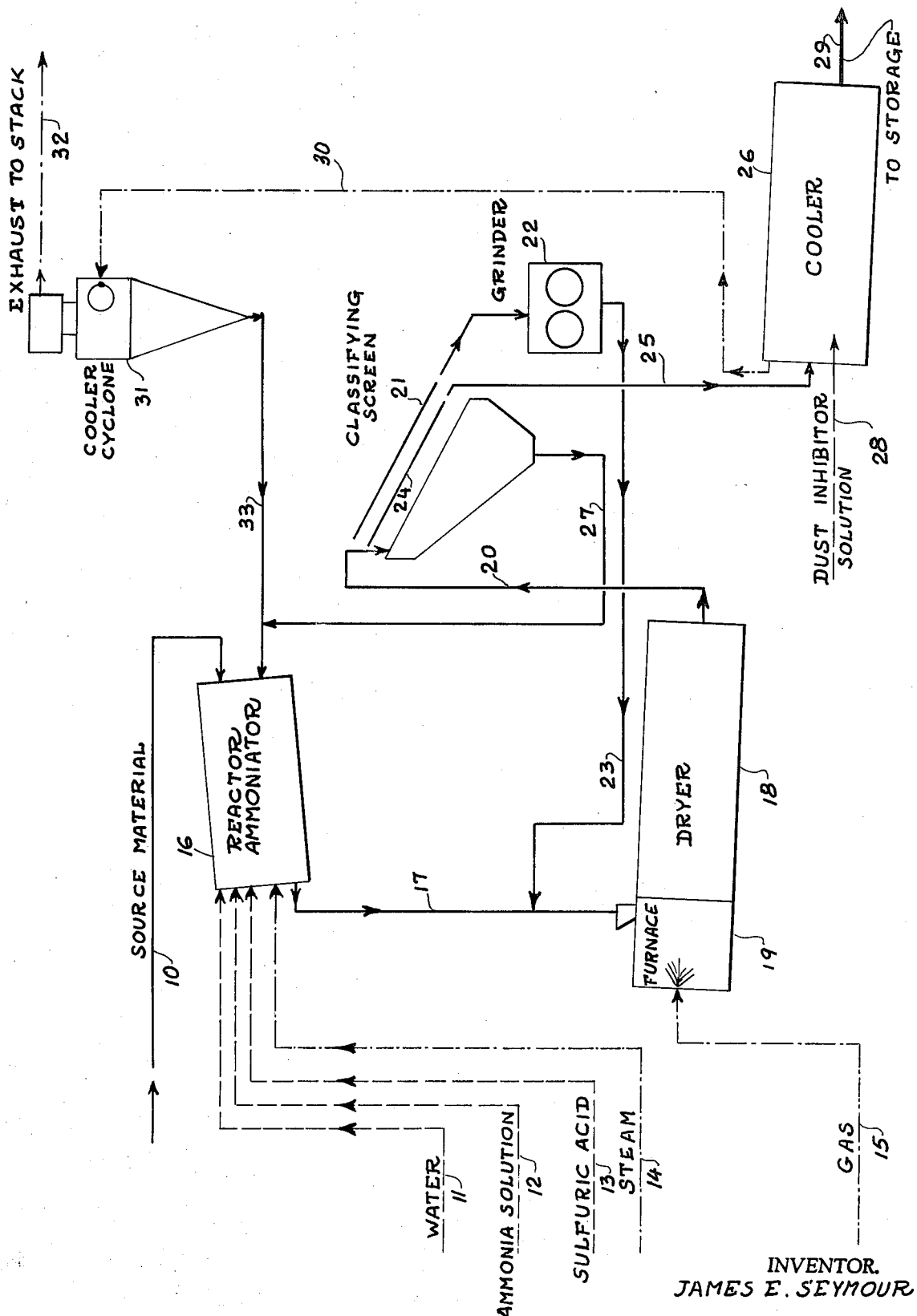

PROCESS FOR REDUCING THE CONCENTRATION OF FERTILIZER PARTICULATES IN EXHAUST STACK GASES

REFERENCE TO RELATED APPLICATIONS

This application is a continuation of co-pending Patent application Ser. No. 83,105, filed Oct. 22, 1970 now abandoned, entitled PROCESS FOR REDUCING THE CONCENTRATION OF FERTILIZER PARTICULATES IN EXHAUST STACK GASES.

Reference is also made to co-pending Patent application Ser. No. 82,950, filed Oct. 22, 1970, entitled PROCESS FOR REDUCING EMISSION OF DUST BY GRANULAR FERTILIZER COMPOSITIONS, now U.S. Pat. No. 3,734,707 issued May 22, 1973.

BACKGROUND OF THE INVENTION

1. Field of the Invention

The present invention relates to abatement of air pollution caused by fertilizer particulates emitted with exhaust stack gases produced in manufacturing fertilizer compositions.

2. Description of the Prior Art

Elimination of finely dispersed particulates in exhaust stack gases of fertilizer manufacturing plants is most difficult. However, apparatus and methods for reducing the concentration of particulates in flue stack gases are well known in the fertilizer manufacturing industry and include electrostatic precipitators, fabric filter collectors, scrubbers, and mechanical collectors such as wet and dry cyclone separators. A control system for preventing the discharge of wastes, including dusts, and employing wet and dry cyclone separators and also scrubbers is described in Sackett, U.S. Pat. No. 3,499,731. It is also well known to employ water and aqueous solution sprays in incinerators and in dryers for granular materials to reduce the concentration of undersize particulates. Karcher, U.S. Pat. No. 3,264,084, shows a "dust" eliminator employed in conjunction with a rotary dryer and the use of solutions of potassium hydroxide or ligno sulfonates to spray on the material in the dryer to control undersize fines known as dust in the fertilizer material.

However, particle size is the principal limiting factor in using dry cyclone separators. For particulates below 10 microns in diameter the separation efficiency for dry cyclones falls off rapidly. The more complex and more costly wet cyclone separators are more efficient for removing fine air-borne particulates but require additional equipment, such as scrubbers, to remove the solids from the air stream as is shown in the Sackett patent.

SUMMARY OF THE INVENTION

In accordance with the present invention air pollution caused by emission of fine particulates of fertilizers in exhaust stack gases is substantially reduced by spraying aqueous solutions of nitrogen-containing compounds into the feed or intake to the air cooler for the furnace-dried and granulated fertilizer compositions. The nitrogen-containing aqueous spray of the invention bonds the fine dust-like particles in the air stream of the cooler to one another and to relatively larger particles of fertilizer and thus serves to agglomerate dust-like particles with the formation, in turn, of particles of both increased density and greater projected surface area. Consequently, there is a reduction in the concentration of air-borne fertilizer particles transported by the air stream from the cooler to the cyclone separators and ultimately emitted from the exhaust stack into the surrounding atmosphere. Concomitantly, the nitrogen-containing aqueous spray adds plant food value to the fertilizer composition.

Accordingly, the principal object of the present invention is to provide a process for reducing atmospheric pollution by fertilizer particulates emitted in exhaust stack gases generated in fertilizer manufacture.

Another object of the present invention is to provide a process for reducing the concentration of fertilizer dust retained within the fertilizer manufacturing system itself.

Still another object of the present invention is to provide a process for manufacturing granular fertilizers that produce less air-borne dust both in manufacture and in subsequent mixing, blending and application.

A process for reducing emission of air-borne particulates by spraying at the end of the cooling phase of the manufacturing procedure is disclosed in my co-pending patent application Ser. No. 82,950, now U.S. Pat. No. 3,734,707, filed even date with parent application Ser. No. 83,105, as referred to above.

BRIEF DESCRIPTION OF THE DRAWING

The above and other objects and applications of the present invention are obtained by the process indicated in the single FIGURE of the accompanying drawing which forms a part of this application and as is subsequently described in detail herein.

DETAILED DESCRIPTION OF THE DRAWING AND OF A PREFERRED EMBODIMENT OF THE INVENTION

Referring now to the drawing which represents a diagrammatic flow sheet of an embodiment of the present process, line 10 supplies reactor-ammoniator 16 with particulate raw materials such as superphosphates, potassic ingredients, solid nitrogenous ingredients, line 11 supplies water, line 12 supplies ammonia solution, line 13 supplies sulfuric acid, and line 14 supplies steam for (1) ammoniating the acidic components to form ammonium salts and (2) agglomerating the finely divided or comminuted particulates to form fertilizer granules. The partially granulated reaction mixture then passes through line 17 to the rotating drum dryer 18 which is heated by gas furnace 19 supplied by gas line 15. From the dryer the fertilizer granules pass through line 20 to classifying screen 21 from which the granules too large to pass through the screen move to grinder 22 from which the comminuted granules are returned by line 23 to dryer feed line 17. The granules retained by the size screen 24 move through line 25 to air cooler 26 while the fine particles passed by the size screen are returned to the ammoniator by line 27 and recycled.

At the intake feed to cooler 26, that is, the end of cooler 26 at which the fertilizer granules are introduced, as shown in the drawing. Cooler 26, preferably, is a rotary drum cooler, the fertilizer granules are sprayed with a nitrogen-containing dust inhibitor solution supplied through line 28. From cooler 26 the fertilizer granules, now treated with the dust inhibitor, pass through line 29 to storage bins while the counter-flowing cooler air stream passes through line 30 to the dry cyclone extractor 31, the exhaust of which is blown through line 32 to the flue stack and the fertilizer particles extracted from the cooler air stream are returned by line 23 to the ammoniator for recycling.

In conventional processes for the manufacture of granular fertilizers it is often advantageous to classify the material stream as it is discharged from the dryer. Generally, the product size fraction is fed to the cooler or cooling operation where the temperature of the granular product is reduced prior to bulk or packaged storage. The over size fraction is passed through an attrition or comminution apparatus such as a roll mill, cage mill, chain mill or hammer mill and is recycled to the dryer and the hot, under size fraction is recycled to the ammoniator.

The conventional cooling devices normally used to cool granular fertilizer products include: fluidized bed or semifluidized bed coolers, tray coolers, and rotary drum coolers, the latter being the most widely used type. In the rotary drum cooler, as the drum rotates about its longitudinal axis the particulate fertilizer materials are lifted by a number of flights positioned at various angles with respect to the longitudinal axis and dropped through a counter-current flow of air. Generally, a short section of highly pitched flighting is positioned at the extreme intake end of the rotary drum cooler to effect rapid removal of the hot particulates from the intake end. Rapid removal is necessary to prevent cementation of the particulates to each other due to a degree of surface plasticity of the hot particulate cooler feed material.

The inefficacious nature of dry classifying operations on granular fertilizers plus the normal crystallization resulting from the decrease in temperature and moisture of the product in the cooler, coupled with attrition by the mechanical forces inherent in air cooling of the fertilizer granules, results in an air-borne loss of particulates from the product stream.

It has now been found that by injecting from 5 to 100 pounds of an aqueous solution of a nitrogen-containing salt into the feed end of the cooler per ton of granulated fertilizer, the emission of dust particulates from the cooler exhaust stack is substantially reduced. The preferred nitrogen-containing salts include ammonium orthophosphates, ammonium polyphosphates, calcium nitrate, ammonium nitrate, urea, urea phosphate, urea nitrate, and mixtures thereof.

Because of a relatively low hygroscopicity and a negative or very low free moisture potential when hydrolysis occurs, a preferred anti-dust solution is an aqueous solution containing a combination of ammonium orthophosphate and ammonium polyphosphate in amounts such that the total nitrogen content of the dissolved salts is 10 per cent by weight of solution and the phosphate content, expressed as $P_2O_5$, is 34 per cent by weight of solution. The "10-34-0" dust inhibitor solution is a commercial product commonly used to prepare both liquid and suspension fertilizer compositions. Other commercially available nitrogen containing fertilizer solutions may also be used advantageously as dust-inhibitor solutions in the present process. Suitable commercial solutions include: 8-24-0, an aqueous solution of ammonium orthophosphate containing 8 per cent nitrogen; 11-37-0, aqueous solution of ammonium orthophosphate and ammonium polyphosphate containing 11 per cent nitrogen; 190 (0-54-0), aqueous solution of ammonium nitrate containing 19 per cent nitrogen; 210 (0-60-0), aqueous solution of ammonium nitrate containing 21 per cent nitrogen; 280 (0-40-31), aqueous solution of ammonium nitrate and urea containing 28 per cent nitrogen; 300 (0-42-33), aqueous solution of ammonium nitrate and urea containing 30 per cent nitrogen; and 320 (0-44-35), aqueous solution of ammonium nitrate and urea containing 32 per cent nitrogen by weight of solution.

In general, the anti-dust solution is injected by spraying onto the face of the falling screen of granular fertilizer at the point or intersection of conveyor flights and lifting flights of the rotary drum cooler. If a cooler other than a rotary drum type is used, it is preferable to pre-treat the feed material for the cooler by spraying same in a small inclined drum, a short section screw conveyor, a short section of a belt conveyor, or in a feed chute to the cooler.

It is preferable that the granular materials entering the cooler be adequately sized and relatively non-porous with respect to the surface of the particles. The amount of dust inhibitor solution to effectively treat a unit weight of granular fertilizer material varies with the surface area of the granules and the porosity thereof. Generally, the use of 100 pounds of dust inhibitor solution per ton of fertilizer granules would be the maximum required except for fertilizer granules of high porosity in which case more of the dust inhibitor solution may be required.

The dust inhibitor spray solution, whether used as a pre-treatment or as the granular fertilizer enters the cooler, causes fine particles of fertilizer in the cooler to adhere to one another and to larger particles. The inter-particle liquid phase bridge becomes an inter-particle salt bridge knitting the particles firmly together as the liquid phase content is reduced as a result of both evaporation and cooling. This fixation or bonding of the fine particles to particles that are too large or too high in density to become air-borne, substantially reduces the emission of air-borne particulates of fertilizer in the air stream of the manufacturing process. The following examples further illustrate the present invention:

EXAMPLE 1

A 3-9-9 granular tobacco fertilizer product was manufactured at the rate of 25 tons per hour. An aqueous solution of ammonium orthophosphate and ammonium polyphosphate containing the equivalent of 10 per cent nitrogen and 34 per cent $P_2O_5$ by weight was sprayed onto the falling screen of fertilizer product at the feed end of a rotary drum cooler at the rate of 780 pounds of solution per hour which is equivalent to 31.2 pounds of the 10-34-0 dust inhibitor solution per 2,000 pounds of fertilizer product. Air was passed counter-current to the flow of solid material in the drum at a rate of approximately 30,000 cubic feet per minute. The air stream, upon leaving the cooler, was passed through conventional cyclonic dust separators and subsequently exhausted from a stack to the ambient atmosphere. The dust emission in the exhaust air stream was 14 pounds per hour. On a control run, at the same rate of fertilizer production per hour but without using the 10-34-0 dust inhibitor solution, the dust concentration in the exhaust air stream was 69 pounds per hour. Thus the use of the dust inhibitor solution as described above resulted in a 79.7 per cent reduction in the amount of fertilizer dust emitted to the surrounding atmosphere.

EXAMPLE 2

A granular fertilizer product containing the equivalent of 5 per cent nitrogen, 15 per cent phosphorous pentoxide, and 30 per cent potassium oxide by weight was manufactured at the rate of 20 tons per hour. The granular product was furnace-dried, screen-classified, and fed to a rotary drum for cooling with a countercurrent air stream of 30,000 cubic feet per minute. At the feed end of the cooler the falling screen of fertilizer granules was sprayed with an aqueous solution of ammonium orthophosphate and ammonium polyphosphate containing 10 per cent by weight nitrogen equivalent and 34 per cent $P_2O_5$ equivalent at the rate of 780 pounds per hour which is equivalent to 39 pounds of dust inhibitor solution per 2,000 pounds of fertilizer product. Upon leaving the cooler, the air stream was passed through conventional cyclone dust separators and subsequently exhausted from a stack to the ambient atmosphere. The dust emission was at the rate of 28.2 pounds per hour. A control run, manufacturing the same type of fertilizer product at the same rate per hour but omitting the use of the nitrogen-containing dust inhibitor solution as described above, produced a dust emission rate of 98.0 pounds per hour. The use of the dust inhibitor solution thus resulted in a 71.2 per cent reduction in the amount of fertilizer dust emitted as stack exhaust to the surrounding atmosphere.

While the foregoing specification describes the invention in detail and in preferred embodiments, modifications and variations thereof will occur to those skilled in the art. It is to be understood therefore that the appended claims are intended to cover such modifications and variations which are within the scope and spirit of the invention.

What is claimed is:

1. In the manufacture of fertilizer compositions, wherein fertilizer particulates are heat dried and air cooled, the process for reducing the emission of fertilizer dust to the atmosphere in the cooling phase of the operation, which comprises spraying the air-borne fertilizer particulates with an aqueous solution of a nitrogen-containing salt at the intake feed of said cooling phase.

2. The process according to claim 1 in which the aqueous solution contains a mixture of ammonium orthophosphate and ammonium polyphosphate.

3. The process according to claim 2 in which the nitrogen-containing salts are present in the solution in amounts totaling at least 10 per cent by weight nitrogen equivalent.

4. The process according to claim 3 in which the aqueous solution of nitrogen-containing salts is applied at the rate of about 30 to 40 pounds of solution per ton of granulated fertilizer composition.

5. The process according to claim 1 in which the aqueous solution contains about 44 per cent by weight ammonium nitrate and about 35 per cent by weight urea.

6. In the manufacture of fertilizer compositions, wherein fertilizer particulates are heat dried and air cooled, the process for reducing the emission of fertilizer dust to the atmosphere in the cooling phase of the operation, which comprises bonding relatively fine dust-like fertilizer particulates by wetting the air-borne fertilizer with an aqueous solution of a nitrogen-containing salt at the intake feed of said cooling phase, the resulting bonded particulates being relatively heavier and larger than unbonded particulates whereby a portion of said bonded particulates drop out of the air-borne phase, and then separating other particulates from the cooling air before emitting said cooling air to the ambient atmosphere.

7. The process according to claim 6 in which the aqueous solution contains a mixture of ammonium orthophosphate and ammonium polyphosphate.

8. The process according to claim 7 in which the nitrogen-containing salts are present in the solution in amounts totaling at least 10 per cent by weight nitrogen equivalent.

9. The process according to claim 8 in which the aqueous solution of nitrogen-containing salts is applied at the rate of about 30 to 40 pounds of solution per ton of granulated fertilizer composition.

10. The process according to claim 6 in which the aqueous solution contains about 44 per cent by weight ammonium nitrate and about 35 per cent by weight urea.

11. In the manufacture of fertilizer compositions, wherein fertilizer particulates are heat dried and air cooled, the process for reducing the emission of fertilizer dust to the atmosphere in the cooling phase of the operation, which comprises spraying the air-borne fertilizer particulates with an aqueous solution of a nitrogen-containing fertilizer at the intake feed of said cooling phase to create an interparticle salt bridge between air-borne dust particles, and between air-borne dust particles and larger than air-borne particles.

12. The process according to claim 11, in which the aqueous solution contains a mixture of ammonium orthophosphate and ammonium polyphosphate.

13. The process according to claim 12, in which the nitrogen-containing fertilizer is present in the solution in amounts totaling at least 10 per cent by weight nitrogen equivalent.

14. The process according to claim 13, in which the aqueous solution of nitrogen-containing fertilizer is applied at the rate of about 30 to 40 pounds of solution per ton of granulated fertilizer composition.

15. The process according to claim 11, in which the aqueous solution contains about 44 per cent by weight ammonium nitrate and about 35 per cent by weight urea.

16. In the manufacture of fertilizer compositions, wherein fertilizer particulates are heat dried and air cooled, the process for reducing the emission of fertilizer dust to the atmosphere in the cooling phase of the operation, which comprises bonding relatively fine dust-like air-borne fertilizer particulates to each other and to relatively larger fertilizer particulates by wetting the fertilizer with an aqueous solution of a nitrogen-containing fertilizer at the intake feed of said cooling phase, the resulting bonded particulates being relatively heavier and larger than unbonded particulates whereby a portion of said bonded particulates drop out of the air-borne phase, and then separating other particulates from the cooling air before emitting said cooling air to the ambient atmosphere.

17. The process according to claim 16, in which the aqueous solution contains a mixture of ammonium orthophosphate and ammonium polyphosphate.

18. The process according to claim 17, in which the nitrogen-containing fertilizer is present in the solution in amounts totaling at least 10 per cent by weight nitrogen equivalent.

19. The process according to claim 18, in which the aqueous solution of nitrogen-containing fertilizer is applied at the rate of about 30 to 40 pounds of solution per ton of granulated fertilizer composition.

20. The process according to claim 16, in which the aqueous solution contains about 44 per cent by weight ammonium nitrate and about 35 per cent by weight urea.

21. In the manufacture of fertilizer compositions, wherein fertilizer particulates are heat dried and air cooled, the process for reducing the emission of fertilizer dust to the atmosphere in the cooling phase of the operation, which comprises spraying the air-borne fertilizer particulates with an aqueous solution of a nitrogen-containing salt at the intake feed of said cooling phase to create an interparticle salt bridge between air-borne dust particles, and between air-borne dust particles, and between air-borne dust particles and larger than air-borne particles.

22. In the manufacture of fertilizer compositions, wherein fertilizer particulates are heat dried and air cooled, the process for reducing the emission of fertilizer dust to the atmosphere in the cooling phase of the operation, which comprises spraying air-borne fertilizer particulates with an aqueous solution of a nitrogen-containing salt at the intake feed of said cooling phase at a rate of not less than five pounds of solution per ton of fertilizer composition to create an interparticle salt bridge between air-borne dust particles, and between air-borne dust particles and larger than air-borne particles.

23. In the manufacture of fertilizer compositions, wherein fertilizer particulates are heat dried and air cooled, the process for reducing the emission of fertilizer dust to the atmosphere in the cooling phase of the operation, which comprises bonding relatively fine air-borne dust-like fertilizer particulates to each other and to relatively large fertilizer particulates by wetting the fertilizer with an aqueous solution of a nitrogen-containing salt at the intake feed of said cooling phase at a rate of not less than five pounds of solution per ton of fertilizer composition, the resulting bonded particulates being relatively heavier and larger than unbonded particulates whereby a portion of said bonded particulates drop out of the air-borne phase, and then separating other particulates from the cooling air before emitting said cooling air to the ambient atmosphere.

24. In the manufacture of fertilizer compositions, wherein fertilizer particulates are heat dried and air cooled, the process for reducing the emission of fertilizer dust to the atmosphere in the cooling phase of the operation, which comprises spraying air-borne fertilizer particulates with an aqueous solution of a nitrogen-containing fertilizer at the intake feed of said cooling phase at a rate of not less than five pounds of solution per ton of fertilizer composition to create an interparticle salt bridge between air-borne dust particles, and between air-borne dust particles and larger than air-borne particles.

25. In the manufacture of fertilizer compositions, wherein fertilizer particulates are heat dried and air cooled, the process for reducing the emission of fertilizer dust to the atmosphere in the cooling phase of the operation, which comprises bonding relatively fine air-borne dust-like fertilizer particulates to each other and to relatively larger fertilizer particulates by wetting the air-borne fertilizer with an aqueous solution of a nitrogen-containing fertilizer at the intake feed of said cooling phase at a rate of not less than 5 pounds of solution per ton of fertilizer composition, the resulting bonded particulates being relatively heavier and larger than unbonded particulates whereby a portion of said bonded particulates drop out of the air-borne phase, and then separating other particulates from the cooling air before emitting said cooling air to the ambient atmosphere.

* * * * *